United States Patent
Be et al.

(10) Patent No.: US 10,273,739 B2
(45) Date of Patent: Apr. 30, 2019

(54) AUTOMATED SYSTEM FOR CLOSING A CLOSURE OF A MOTOR VEHICLE BASED UPON TRANSMISSION STATE

(71) Applicant: FORD GLOBAL TECHNOLOGIES, LLC, Dearborn, MI (US)

(72) Inventors: Tuan Anh Be, Livonia, MI (US); Nicholas Colella, Grosse Ile, MI (US); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 15/168,627

(22) Filed: May 31, 2016

(65) Prior Publication Data

US 2017/0342760 A1    Nov. 30, 2017

(51) Int. Cl.
*E05F 15/70* (2015.01)
*B60K 35/00* (2006.01)

(52) U.S. Cl.
CPC .............. *E05F 15/70* (2015.01); *B60K 35/00* (2013.01); *E05Y 2400/42* (2013.01); *E05Y 2400/814* (2013.01); *E05Y 2400/818* (2013.01); *E05Y 2900/531* (2013.01); *E05Y 2900/546* (2013.01)

(58) Field of Classification Search
None
See application file for complete search history.

(56) References Cited

U.S. PATENT DOCUMENTS

| 3,629,817 A | 12/1971 | Hill |
| 6,727,806 B1 | 4/2004 | Massie et al. |
| 7,118,155 B2 | 10/2006 | Miyake et al. |
| 8,606,467 B2 | 12/2013 | Gehin |
| 8,755,975 B2 * | 6/2014 | Oakley ................ E05F 15/20 318/282 |
| 2013/0332033 A1 * | 12/2013 | Debouk ................ B60R 16/02 701/49 |
| 2016/0159369 A1 * | 6/2016 | Park ..................... B60K 28/12 701/65 |

FOREIGN PATENT DOCUMENTS

| CN | 201677813 U | 12/2010 |
| CN | 102602367 A | 7/2012 |
| JP | 2005054466 A | 3/2005 |
| KR | 0157819 B1 | 10/1998 |

OTHER PUBLICATIONS

English Machine Translation of CN102602367A.
English Machine Translation of KR0157819B1.
English Machine Translation of CN201677813U.
English Machine Translation of JP2005054466A.

\* cited by examiner

*Primary Examiner* — Mussa A Shaawat
*Assistant Examiner* — Abdhesh K Jha
(74) *Attorney, Agent, or Firm* — Jason Rogers; Vichit Chea; King & Schickli, PLLC

(57) ABSTRACT

An automated system is provided for closing a closure of a motor vehicle. That automated system includes a plurality of closures, a plurality of closure modules for opening and closing that plurality of closures and a control module. The control module is configured to monitor a transmission state of the motor vehicle and an open/close state of the plurality of closures and then close an open closure of the plurality of closures when the transmission is shifted out of park and the open closure is detected. A related method is also provided.

8 Claims, 3 Drawing Sheets

AUTOMATED SYSTEM FOR CLOSING A CLOSURE OF A MOTOR VEHICLE BASED UPON TRANSMISSION STATE

TECHNICAL FIELD

This document relates generally to the motor vehicle equipment field and, more particularly, to an automated system for closing a closure of the motor vehicle based upon a transmission state of the motor vehicle.

BACKGROUND

At some point in time, virtually every driver of a motor vehicle has placed the transmission of the motor vehicle in gear and started the motor vehicle in motion only to subsequently find that one closure of the motor vehicle, be it a door, a hood or a trunk lid, is not properly closed. Thus, there are times when a driver needs to, for example, stop a vehicle and get out in order to close the trunk lid. This raises the prospect of leaving the vehicle in a high traffic area and the safety risks involved with that situation. At other times a driver may need to open and close a door in order to shut it tight. Many times a driver tries to do this while driving the vehicle thereby becoming distracted and losing focus on his driving.

This document relates to a new and improved automated system and related method for closing a closure of a motor vehicle in these situations. Advantageously, the system and method also accommodate those times when a driver intentionally leaves a certain door or closure open such as when backing the motor vehicle to dock his boat or carrying oversized cargo in the motor vehicle trunk.

SUMMARY

In accordance with the purposes and benefits described herein, an automated system is provided for closing a closure of the motor vehicle. That automated system comprises a plurality of closures, a plurality of closure modules for opening and closing the plurality of closures and a control module. The control module is configured to (a) monitor a transmission state of the motor vehicle and the open/close status of the plurality of closures and (b) close an open closure of the plurality of closures when the transmission is shifted out of park and an open closure is detected.

The control module may be further configured to alert an occupant of the motor vehicle to detection of the open closure and request instructions from the occupant to close the open closure before actually issuing a command to close the open closure.

In accordance with an additional aspect, a method is provided of closing an open closure of a motor vehicle. That method may be broadly described as comprising the steps of (a) monitoring, by a first device, a transmission state of the motor vehicle, (b) monitoring, by a second device, an open/close status of a closure of the motor vehicle and (c) closing, by a control module, an open closure when the transmission is shifted out of park and the open closure is detected.

The method may further include the step of alerting, by the control module, an occupant of the motor vehicle to the open closure. That alerting may be done by display screen message or voice message via a voice processor.

In addition, the method may further include the step of requesting, by the control module, instructions from the occupant to close the open closure before actually closing the open closure. Those instructions may be requested via display screen message or voice message via a voice processor. In accordance with still another aspect, the method may include monitoring, by a plurality of second devices, the open/close status of a plurality of closures of the motor vehicle including, for example, all of the doors of the motor vehicle that allow passengers access to the motor vehicle passenger compartment as well as a lift gate, hatch back or trunk lid which allows access to a storage area. Further, the engine compartment hood may also be monitored.

In the following description, there are shown and described several preferred embodiments of the automated system and the related method for closing a closure of a motor vehicle. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the automated system and related method and together with the description serve to explain certain principles thereof. In the drawing figures.

Reference will now be made in detail to the present preferred embodiments of the automated system and method, examples of which are illustrated in the accompanying drawing figures.

DETAILED DESCRIPTION

Figure 1:
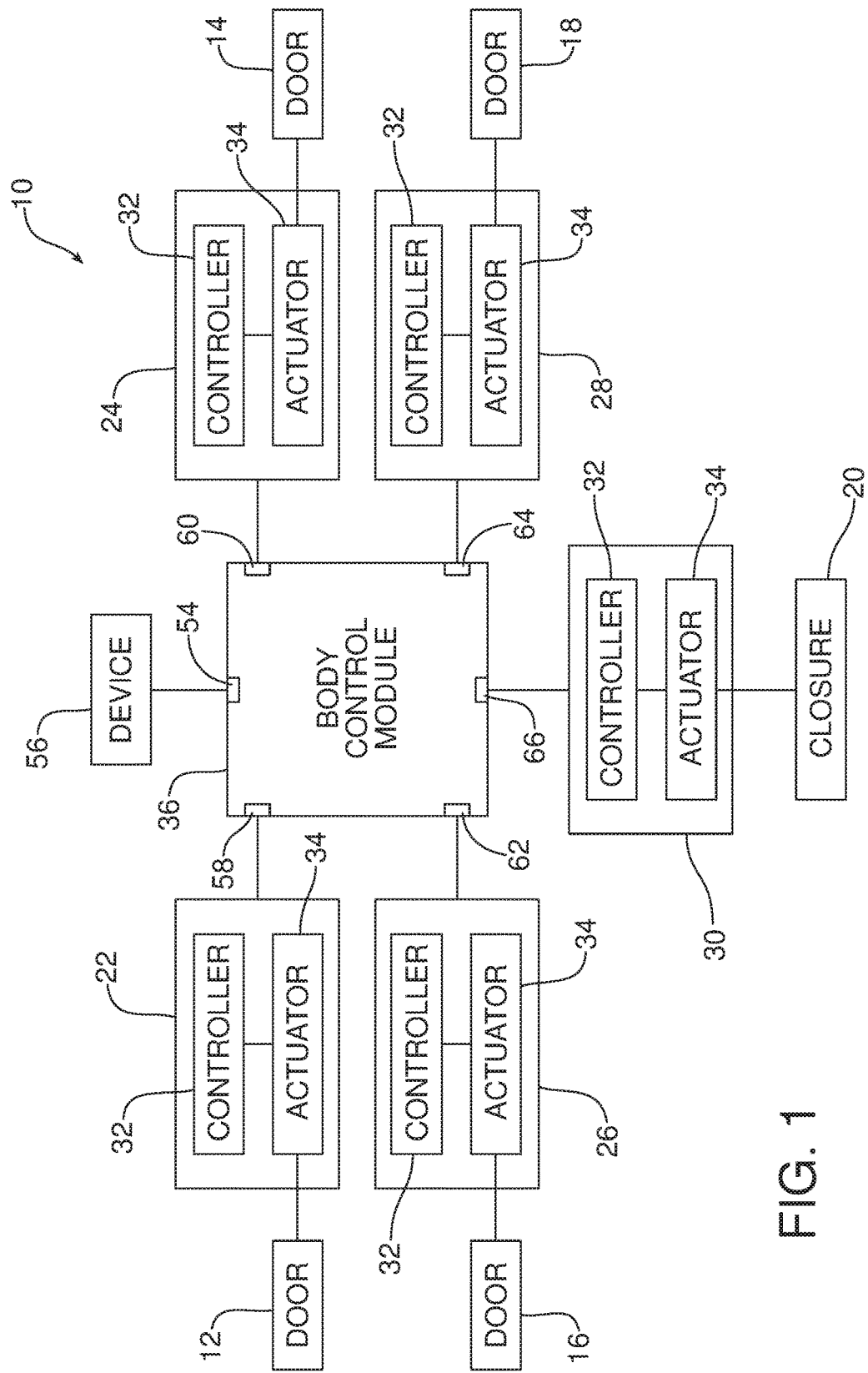
FIG. 1 is a schematic block diagram of the automated system for closing a closure of a motor vehicle.

Reference is now made to FIG. 1 illustrating the automated closure system 10 particularly adapted for use with a motor vehicle. As illustrated in FIG. 1, the automated closure system 10 includes a plurality of closures including a right front door 12, a left front door 14, a right rear door 16, a left rear door 18, and a storage compartment closure 20 such as a tail gate, lift gate, hatch back or trunk lid depending upon the type of motor vehicle.

A plurality of closure modules 22, 24, 26, 28, 30 are provided for opening and closing each of the closures 12, 14, 16, 18, 20. Thus, closure module 22 is provided to open and close the right front door 12. Closure module 24 is provided to open and close the left front door 14. Closure module 26 is provided to open and close the right rear door 16. Closure module 28 is provided to open and close the left rear door 20. Finally, closure module 30 is provided to open and close the storage compartment closure 20.

As is known in the art, each closure module 22, 24, 26, 28, 30 includes a controller 32 and a mechanical actuator 34 for opening and closing the associated closure 12, 14, 16, 18, 20 in accordance with command instructions received from the associated controller 32.

Each controller 32 may comprise a computing device such as a dedicated micro-processor or electronic control unit (ECU) operating in accordance with instructions received from appropriate control software.

As further illustrated in FIG. 1, the automated system 10 includes a control module 36. In the illustrated embodiment, the control module 36 comprises a body control module or BCM.

Figure 2:
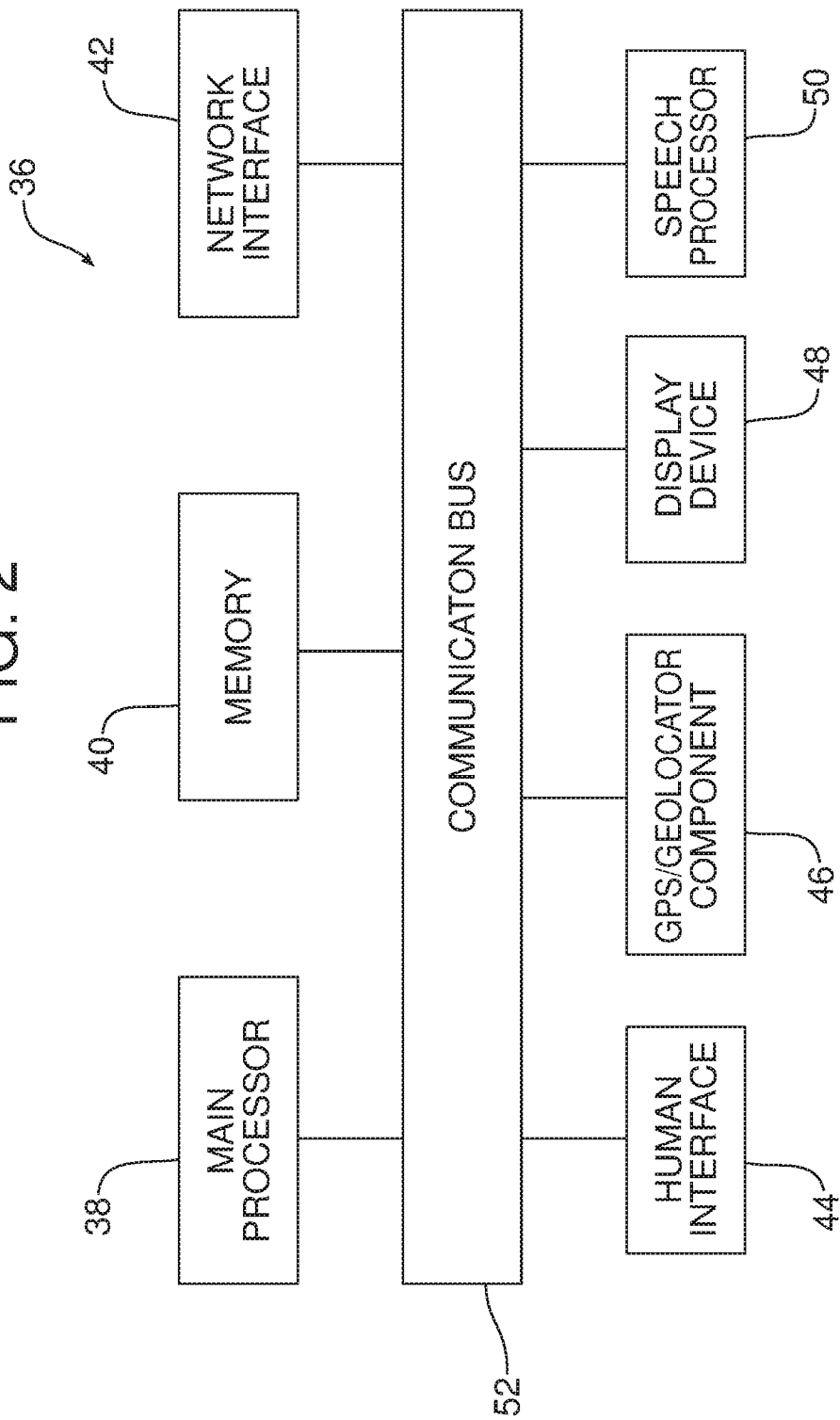
FIG. 2 is a schematic block diagram of a body control module of the type that may be incorporated into the automated system demonstrated in FIG. 1.

As best illustrated in FIG. 2, a BCM 36 may comprise a computing device having one or more processors 38, one or more memories 40, one or more network interfaces 42, a human interface 44, a GPS/geolocator 46, a display device such as a multi-function display with touchscreen capability 48 and a speech processor 50 that all communicate with each other over a communication bus 52. The BCM 36 may perform a number of interior body electrically based functions including, for example, interior locking, remote key entry, interior lighting, exterior lighting, windshield wiper control and the like. In some embodiments the BCM 36 may also function to control entertainment functions (e.g. radio, CD player and communications such as telephone and internet communications over a wireless network. In some embodiments, the BCM 36 is connected by a communication bus (not shown) to other control modules that provide one or more of these additional functions.

A control module or BCM 36 of the automated system 10 is configured to monitor a transmission state of the motor vehicle and the open/close status of the plurality of closures 12, 14, 16, 18, 20. Thus, the body control module 36 includes a data input 54 connected to a device 56, such as a sensor or control module capable of providing data respecting the transmission state of the motor vehicle. Further, the control module/BCM 36 includes additional data inputs 58, 60, 62, 64 and 66 connected, respectively to the closure modules 22, 24, 26, 28, 30 which provide data respecting the open/close status of the closure 12, 14, 16, 18, 20 to which the closure modules are associated.

Figure 3:
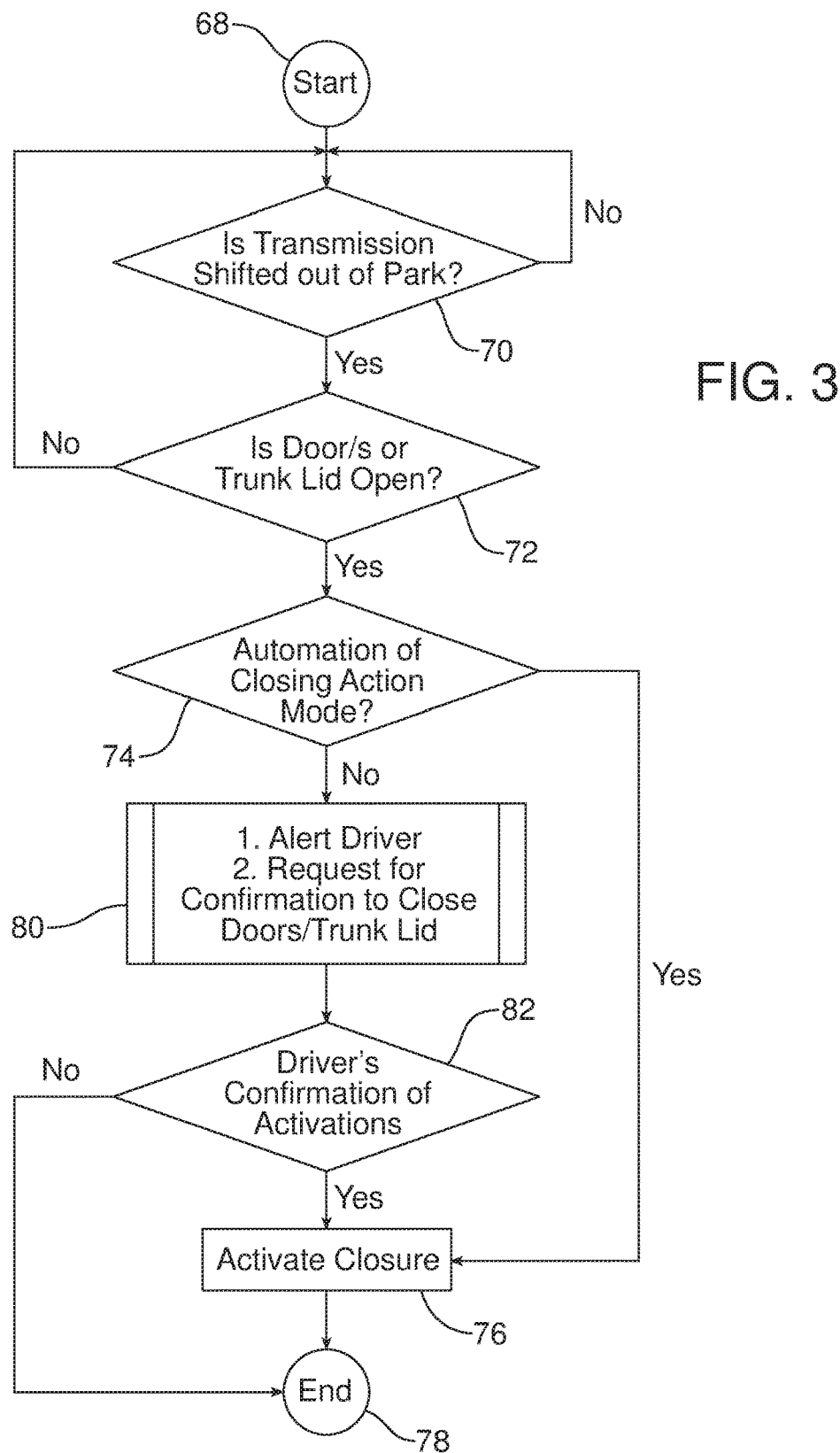
FIG. 3 is a control logic flow diagram for the system and method.

Reference is now made to FIG. 3 illustrating a method of operation of the system 10. Upon system initiation (Box 68), the control module/BCM 36 monitors the transmission state of the motor vehicle to determine whether the transmission has been shifted out of park (Box 70). If the motor vehicle transmission has been shifted out of park as indicated by data received from the device 56 at data input 54, the control module/BCM 36 then monitors the open/close status of the various closures 12, 14, 16, 18, 20 to determine if any of the closures are open (Box 72). If one or more of the closures 12, 14, 16, 18, 20 is indicated as being open (by data received by the control module/BCM 36 at the data inputs 58, 60, 62, 64, 66 from the closure modules 22, 24, 26, 28, 30) then the control module/BCM 36 goes to Box 74. If the system 10 is operating in automated closing action mode, the control module/BCM 36 sends an appropriate command signal to the closure module 22, 24, 26, 28, 30 associated with the open closure 12, 14, 16, 18, 20 commanding the controller 32 of that closure module to activate the mechanical actuator 34 of that closure module and close the open closure. See Box 76. The system 10 then ends operation at Box 78.

In contrast, there are times when the motor vehicle operator will wish to move the motor vehicle with the intention to have a closure open for a particular reason. This may occur when, for example, backing up a trailer or transporting an oversized load in the trunk. Toward this end, the motor vehicle operator will switch system 10 out of automated closing action mode. When the system 10 is not in automated closing action mode as queried at Box 74, the control module/BCM 36 goes to Box 78 and alerts the driver or other occupant of the motor vehicle to the open closure and then requests confirmation or instructions to close the open closure (Box 80). The alert may be provided via a voice message through the voice processor 50 and/or via a display screen message through the display device 48. Similarly, the request may be provided via voice message through the speech processor 50 or by display screen message via the display device 48. If the driver provides confirmation or instructions to close the open closure at Box 82, the control module/BCM 36 provides a command to the appropriate closure module 22, 24, 26, 28, 30 associated with the open closure 12, 14, 16, 18, 20 causing the controller 32 of that closure module to direct the associated mechanical actuator 34 to complete the closing of the closure at Box 76. The system cycle then ends at Box 78. In contrast, if the driver or occupant does not provide confirmation or instruction to close the open closure, the control module/BCM 36 goes directly to the end of the operating cycle at Box 78 and the closure remains open until the motor vehicle operator enters a command to close the closure via voice command, human interface 44 or other means.

As should be appreciated from viewing FIG. 3, if after system initiation (Box 68) the transmission is maintained in park, as indicated at Box 70, the system 10 re-initializes the control logic process. Similarly, if none of the closures 12, 14, 16, 18, 20 are open at Box 72, the automated system 10 re-initializes the control logic process.

The foregoing has been presented for purposes of illustration and description. It is not intended to be exhaustive or to limit the embodiments to the precise form disclosed. Obvious modifications and variations are possible in light of the above teachings. For example, automated closure system 10 may be easily adapted for use with a motor vehicle equipped with a manual transmission. In one possible embodiment, this may be accomplished by treating such a manual transmission state in "neutral" like an automatic transmission state in "park". See FIG. 3. All such modifications and variations are within the scope of the appended claims when interpreted in accordance with the breadth to which they are fairly, legally and equitably entitled.

What is claimed:

1. An automated system for closing a closure of a motor vehicle, comprising:
   a plurality of closures;
   a plurality of closure modules for opening and closing said plurality of closures; and
   a control module configured to monitor a transmission state of said motor vehicle and open/close status of said plurality of closures and close an open closure of said plurality of closures when said transmission is shifted out of park and said open closure is detected.

2. The automated system of claim 1, wherein said control module is further configured to alert an occupant of said motor vehicle to detection of said open closure and request instructions from said occupant to close said open closure before actually closing said open closure.

3. A method of closing an open closure of a motor vehicle, comprising:
   monitoring, by a first device, a transmission state of said motor vehicle;
   monitoring, by a second device, an open/close status of a closure of the motor vehicle;
   closing, by command of a control module, an open closure when said transmission is shifted out of park and said open closure is detected; and
   alerting said occupant to the open closure by voice message via a voice processor.

4. A method of closing an open closure of a motor vehicle, comprising:
- monitoring, by a first device, a transmission state of said motor vehicle;
- monitoring, by a plurality of second devices, an open/close status of a plurality of closures of said motor vehicle;
- closing, by command of a control module, an open closure when said transmission is shifted out of park and said open closure is detected from said plurality of closures; and
- alerting, by voice message via a voice processor, an occupant of said motor vehicle to said open closure.

5. The method of claim 4, further including requesting, by said control module, instructions from said occupant to close said closure before actually closing said closure.

6. The method of claim 5, including alerting said occupant by a display screen message.

7. The method of claim 5, including requesting, by said control module, instructions from said occupant by a display screen message.

8. The method of claim 5, including requesting, by said control module, instructions from said occupant by voice message via a voice processor.

* * * * *